Jan. 26, 1965

L. R. GRAY 3,166,863

REFLECTING DEVICE FOR DISPLAYS

Filed Dec. 26, 1961

INVENTOR:
LANDON R. GRAY

BY

Mellin and Hanscom

ATTORNEYS

United States Patent Office 3,166,863
Patented Jan. 26, 1965

3,166,863
REFLECTING DEVICE FOR DISPLAYS
Landon R. Gray, San Pedro, Calif., assignor, by mesne assignments, to Solaray Industries, Inc., Torrance, Calif., a corporation of California
Filed Dec. 26, 1961, Ser. No. 161,980
5 Claims. (Cl. 40—138)

This invention relates to devices which are used for attracting attention to a display. More particularly, the invention consists of a plurality of reflecting discs that are mounted upon support fingers. While devices of this kind are generally known and have been extensively used in connection with outdoor advertising, the present invention distinguishes from such devices by the particular manner in which the reflecting discs are supported and retained upon their mounting fingers.

In brief, this invention involves an improved mounting construction which utilizes disc-supporting fingers having a curved upper supporting surface and disc members that are supported thereon along the curvilinear edge of an elongated slot. This construction provides an extremely large bearing surface, allowing the disc members to pivot without undue localized wear. But, also, the curved upper supporting surfaces enable the disc members to pivot with relative freedom in the plane of the discs.

The invention also comprises the more specific construction and use of disclike elements having an elongated slot that is substantially crescent shape having a curvilinear upper edge extending downwardly beyond the lateral edges of the support finger and terminating at stop edges on either end. The stop edges allow the disclike elements to be pivoted in a plane substantially normal to the support finger, but only with restricted or limited movement, thereby preventing an inadvertent "hang up" of the disclike elements.

Another feature of the invention exists in providing each support finger with a depressed saddle for receiving the disclike elements thereon and to inhibit their movement in directions axially of the finger. Also, a pair of shoulder portions extend laterally of the support fingers, and when the disclike elements are pivoted upon a vertical axis through the depressed saddle their movement is limited by stop surfaces.

It is to be understood, therefore, that the novel construction of devices made in accordance with the present inventive concept and teaching provides a relatively large bearing surface for disclike elements but insures a limited amount of disc movement in all directions.

Several objects of this invention have particularly been indicated above and other objects will become apparent in view of the drawings and the following detailed description.

Referring to the drawings forming a part of this application, and in which like parts are designated by like reference numerals throughout the same, FIG. 1 is a perspective view of a display device constructed in accordance with the teaching of the present invention;

Figure 1:
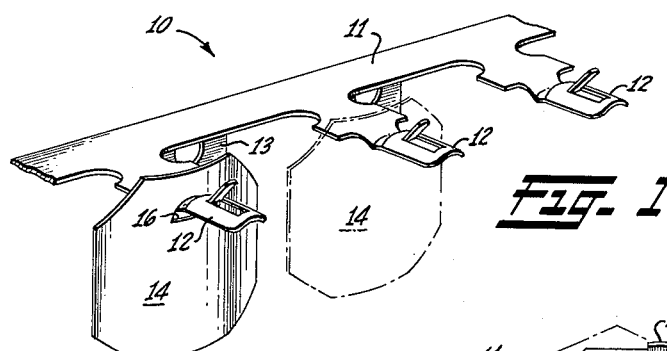
Figure 2:
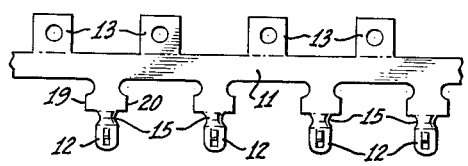
FIG. 2 is a plan view of the means for supporting a plurality of disclike reflector elements.

There is shown, in FIGS. 1 and 2 of the drawings, an attraction device 10 comprising a strip 11 having a plurality of spaced finger members 12 and 13. A plurality of disclike reflector elements 14 are also provided, one disc element being mounted upon its own finger member 12. Fingers 13 are used for attaching strip 11 to a plate in the customary manner. Device 10 as a whole may be formed by stamping the strip 11 and its reflector elements 14 from sheet metal.

It will be more particularly noted that finger members 12 are each formed with a depressed saddle 15 having an upper supporting surface curving downward and forming an arc portion of a circular cross section. The reflector elements 14 are supported upon the saddle 15 and for this purpose the disclike elements are provided with a crescent shaped slot 16 having a curvilinear upper edge resting upon the saddle 15. Slot 16 is formed on an imaginary line between the geometric center of the element and one side thereof, and it extends downwardly beyond the lateral edges of the finger 12 and terminates at stop edges 17 and 18 on either end, said edges limiting the pivotal movement of the disclike element when it is rotated upon the saddle 15.

Figure 3:
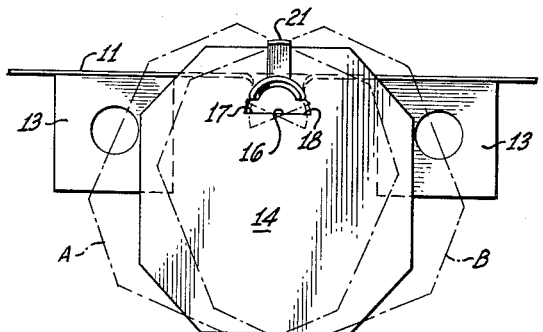
FIG. 3 is a front elevation of a single reflector element mounted upon its finger support and showing limit positions into which the element may be pivoted upon a horizontal axis.

FIG. 3 most clearly demonstrates the extreme positions A and B into which disclike elements 14 may be pivoted in a plane substantially normal to the axis of finger 12 and its saddle 15.

Figure 4:
FIG. 4 is a plan view of the reflector element shown in FIG. 3 and also showing limit positions into which the element may be oriented.

Finger members 12 are formed with shoulder portions 19 and 20 which extend laterally on opposite sides thereof. These shoulder portions provide stop surfaces limiting pivotal movement of elements 14 upon a vertical axis as shown in FIG. 4, where disc positions C and D demonstrate the limits imposed. By regulating the width of the shoulder portions 19 and 20, it will be realized, the angle of disc movement upon the vertical axes are controlled; and it has been found that a limited movement of 30° to either side of a center position is suitable for proper functioning since it effectively prevents objectionable "hang ups."

Figure 5:
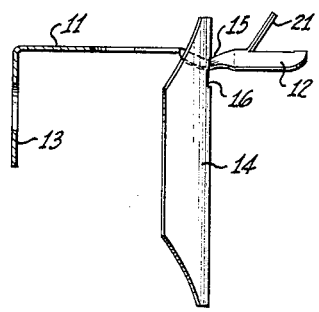
FIG. 5 is a side elevation of the reflector element shown in FIGS. 3 and 4.

Referring to FIGS. 3 and 5, it will be apparent that a lip 21 may be punched upward from the fingers 12 to retain each reflector element upon its finger. Under normal conditions the elements would be held upon the fingers by inherent shape of the depressed saddle 15 but the lip 21 will prevent accidental or inadvertent removal.

In view of the above description, it should be apparent that various changes may be made in the size, shape and arrangement of certain parts without departing from the spirit of this invention or the scope of the attached claims, and each of such changes is contemplated.

Having thus described my invention, what I claim and desire to obtain by Letters Patent is:

1. An attraction display device comprising a finger comprising a depressed saddle intermediate forward and rearward ends, said saddle having a curved upwardly convex supporting surface and lower downwardly facing lateral edges on respective opposite sides of said supporting surface and upwardly and rearwardly sloping edges extending rearwardly of said saddle to define a low portion of said saddle, and a disclike element having a slot therethrough located between the geometric center of said element and one side thereof, said slot having a curvilinear upper edge substantially complementary to said upwardly convex supporting surface whereby the disclike element is supported at the low portion of said saddle, said slot having shoulders located respectively adjacent and below said lateral edges whereby to limit pivotal movement of the disclike element when rotated in a plane substantially normal to the support finger.

2. An attraction display device comprising a body of sheet material, a plurality of support fingers of said material extending forwardly of said body, each said finger comprising a depressed saddle intermediate forward and rearward ends, said saddle having a curved upwardly convex supporting surface and lower downwardly facing lateral edges on respective opposite sides of said supporting surface and upwardly and rearwardly sloping edges extending rearwardly of said saddle to define a low portion of said saddle, and a disclike element for each finger having a slot therethrough located between the geometric center of said element and one side thereof, said slot having a curvilinear upper edge substantially complementary to said upwardly convex supporting surface whereby the disclike element is supported at the low portion of said saddle, said slot having a substantially straight transversely extending lower edge forming at opposite ends thereof, shoulders located respectively adjacent and below said lateral edges whereby to limit pivotal movement of the disclike element when rotated in a plane substantially normal to the support finger.

3. An attraction display device comprising a finger comprising a depressed saddle intermediate forward and rearward ends, said saddle having a curved upwardly convex supporting surface and lower downwardly facing lateral edges on respective opposite sides of said supporting surface and upwardly and rearwardly sloping edges extending rearwardly of said saddle to define a low portion of said saddle, and a disclike element having a slot therethrough located between the geometric center of said element and one side thereof, said slot having a curvilinear upper edge substantially complementary to said upwardly convex supporting surface whereby the disclike element is supported at the low portion of said saddle, said slot having a substantially straight transversely extending lower edge forming at opposite ends thereof shoulders located respectively adjacent and below said lateral edges whereby to limit pivotal movement of the disclike element when rotated in a plane substantially normal to the support finger, and an upwardly extending lip located forwardly of said saddle adapted to inhibit inadvertent removal of said disclike element from the support finger.

4. An attraction display device comprising a finger comprising a depressed saddle intermediate forward and rearward ends, said saddle having a curved upwardly convex supporting surface and lower downwardly facing lateral edges on respective opposite sides of said supporting surface and upwardly and rearwardly sloping edges extending rearwardly of said saddle to define a low portion of said saddle, and a disclike element having a slot therethrough located between the geometric center of said element and one side thereof, said slot having a curvilinear upper edge substantially complementary to said upwardly convex supporting surface whereby the disclike element is supported at the low portion of said saddle, said slot having a substantially straight transversely extending lower edge forming at opposite ends thereof shoulders located respectively adjacent and below said lateral edges whereby to limit pivotal movement of the disclike element when rotated in a plane substantially normal to the support finger, said finger having laterally extending shoulders located rearwardly of said saddle adapted to limit pivotal movement of said disclike element about a central vertical axis.

5. An attraction display device comprising a body of sheet material, a plurality of support fingers of said material extending forwardly of said body, each said finger comprising a depressed saddle intermediate forward and rearward ends, said saddle having a curved upwardly convex supporting surface and lower downwardly facing lateral edges on respective opposite sides of said supporting surface and upwardly and rearwardly sloping edges extending rearwardly of said saddle to define a low portion of said saddle, and a disclike element for each finger having a slot therethrough located between the geometric center of said element and one side thereof, said slot having a curvilinear upper edge substantially complementary to said upwardly convex supporting surface whereby the disclike element is supported at the low portion of said saddle, said slot having a substantially straight transversely extending lower edge forming at opposite ends thereof shoulders located respectively adjacent and below said lateral edges whereby to limit pivotal movement of the disclike element when rotated in a plane substantially normal to the support finger, said finger having laterally extending shoulders located rearwardly of said saddle adapted to limit pivotal movement of said disclike element about a central vertical axis, and an upwardly extending lip located forwardly of said saddle adapted to inhibit inadvertent removal of said disclike element from the support finger.

References Cited in the file of this patent

UNITED STATES PATENTS

| 1,510,494 | Gurley | Oct. 7, 1924 |
| 2,795,070 | Touche | June 11, 1957 |
| 2,938,291 | Tavan | May 31, 1960 |
| 2,969,606 | Battaglia | Jan. 31, 1961 |
| 3,026,608 | Holcombe | Mar. 27, 1962 |

FOREIGN PATENTS

| 212,755 | Austria | Jan. 10, 1961 |
| 516,268 | Italy | Feb. 19, 1955 |
| 520,358 | Italy | Mar. 21, 1955 |
| 538,193 | Italy | Jan. 18, 1956 |